(12) United States Patent
Wolff et al.

(10) Patent No.: US 9,284,216 B2
(45) Date of Patent: Mar. 15, 2016

(54) OPTICAL GLASS AND OPTICAL ELEMENT

(71) Applicant: SCHOTT AG, Mainz (DE)

(72) Inventors: Silke Wolff, Hueckeswagen (DE);
Simone Monika Ritter, Mainz (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/502,216

(22) Filed: Sep. 30, 2014

(65) Prior Publication Data
US 2015/0094198 A1   Apr. 2, 2015

(30) Foreign Application Priority Data
Sep. 30, 2013   (DE) .......................... 10 2013 219 683

(51) Int. Cl.
*C03C 3/253* (2006.01)
*C03C 3/068* (2006.01)
*C03C 3/15* (2006.01)
*C03C 3/23* (2006.01)

(52) U.S. Cl.
CPC ................. *C03C 3/253* (2013.01); *C03C 3/068* (2013.01); *C03C 3/15* (2013.01); *C03C 3/23* (2013.01)

(58) Field of Classification Search
CPC .......... C03C 3/253; C03C 3/068; C03C 3/15; C03C 3/23
See application file for complete search history.

(56) References Cited

FOREIGN PATENT DOCUMENTS

| JP | 53004023 A | * | 1/1978 |
| JP | 56078447 A | * | 6/1981 |
| JP | 56164033 A | * | 12/1981 |
| JP | 60221338 A | * | 11/1985 |
| JP | 62100449 A | * | 5/1987 |
| SU | 254733 A | * | 10/1969 |

* cited by examiner

*Primary Examiner* — Anthony J Green
*Assistant Examiner* — Elizabeth A Bolden
(74) *Attorney, Agent, or Firm* — Ohlandt, Greeley, Ruggiero & Perle, LLP

(57) ABSTRACT

An optical glass is provided. The optical glass is suitable for use in optical elements including lenses, prisms, light guide rods, arrays, optical fibers, gradient components and optical windows in the fields of imaging, sensor technology, microscopy, medical technology, digital projection, telecommunication, optical messaging technology/information transmission, optics/illumination in the automotive sector, for solar technology, photolithography, steppers, excimer lasers, wafers, computer chips and/or integrated circuits and electronic instruments which contain such circuits and chips. The optical glass contains the components $La_2O_3$, $B_2O_3$, $GeO_2$, $HfO_2$ and $In_2O_3$ and in which the following components are present in the following proportions, in % by weight on an oxide basis:
$SiO_2O_2$ 1-8;
$Sb_2O_3$ 0-<2;
$SiO_2+B_2O_3$ 1-<20; and
$SiO_2+B_2O_3+GeO_2+HfO_2+In_2O_3$ 15-25.

20 Claims, No Drawings

OPTICAL GLASS AND OPTICAL ELEMENT

CROSS REFERENCE TO RELATED APPLICATIONS

This application claims benefit under 35 U.S.C. §119(a) of German Patent Application No. 10 2013 219 683.0, filed Sep. 30, 2013, the entire contents of which are incorporated herein by reference.

BACKGROUND

1. Field of the Invention

The present invention relates to an optical glass and optical elements comprising the optical glass.

2. Description of Related Art

Glasses in the lanthanum crown and lanthanum flint region of the Abbe diagram having a high refractive index and a high Abbe number are sought after, in particular, for the fields of application of imaging, sensor technology, microscopy, medical technology, digital projection, photolithography, laser technology, wafer/chip technology and also for telecommunications, optical messaging technology and optics/illumination in the automotive sector.

Recently, instead of the hitherto customary cutting out of optical components from block or ingot glass, production processes in which directly pressed bodies, i.e. blank-pressed (precision pressed) optical components, and/or close-to-final-shape preforms or intermediate bodies for further pressing, known as "precision gobs", can be obtained directly subsequent to melting of the glass. In general, "precision gobs" are considered to be preferably fully fire-polished, semifreely or freely shaped glass portions which have the same mass and a very similar shape to the desired optical components.

For this reason, increased demand for "short" glasses, i.e. glasses whose viscosity varies greatly with a change in temperature, has recently been reported for process technology in the melt and hotforming. In the production process, this viscosity behaviour has the advantage that the hotforming times and thus the mould closure times can be reduced. As a result, firstly the throughput is increased. Secondly, the moulding material is spared in the close-to-final-geometry precision hotforming. Thus, the overall production costs are reduced. In addition, the more rapid solidification makes it possible to process short glasses having a relatively great tendency to crystallize, which is not possible in the case of similarly crystallization-sensitive longer glasses. In addition, prenucleation which could be a problem in subsequent secondary hotforming steps is avoided or at least drastically reduced.

To achieve the desired optical properties, in particular the low dispersion, i.e. a high Abbe number, conventional optical glasses of this optical position generally contain PbO. In addition, $As_2O_3$ was frequently used as refining agent. Since the glass components PbO and $As_2O_3$ have been considered to be environmentally problematical in recent years, lead- and arsenic-free glasses are preferably being used by most producers of optical instruments and products. In addition, PbO-containing glasses have poor chemical resistance. However, glasses having improved chemical resistance are always of importance for use in high-grade products.

Known lead-free glass variants of the same optical position often contain large amounts of $TiO_2$ in a siliceous glass matrix. However, this gives extremely crystallization susceptible glasses which can frequently not be processed in a secondary hotforming step. Owing to their great hardness, these glasses are also very difficult to work mechanically. Furthermore, such glasses have an impaired transmission at the "blue edge" of the transmission spectrum, i.e. at a wavelength of <420 nm.

As further alternatives, glasses of this optical position have recently frequently been obtained by the use of $Bi_2O_3$. However, these glasses have the disadvantage that they are very sensitive to the redox conditions in the melting apparatus and under unfavourable redox conditions there is the risk of a reduction in transmission due to the formation of $Bi^0$.

It is therefore an object of the present invention to provide optical glasses which avoid the above mentioned disadvantages of the prior art and to achieve the desired optical properties. In particular, a composition range for short optical glasses which makes the desired optical properties ($n_d/v_d$) possible is to be found. The glasses should have a high transmission, good chemical resistance and workability, low production costs and good environmental friendliness. These glasses should preferably be able to be processed via the blank pressing process (precision pressing process) and therefore have low transformation temperatures Tg. Furthermore, they should be able to be readily melted and processed and also have a sufficient crystallization stability for a secondary hotforming step and/or for manufacture in continuously operated apparatuses. Furthermore, a very short glass in a viscosity range from $10^{7.6}$ to $10^{13}$ dPas is desirable.

SUMMARY

An optical glass is provided which contains the components $La_2O_3$, $B_2O_3$, $GeO_2$, $HfO_2$ and $In_2O_3$ and in which the following components are present in the following proportions (in % by weight on an oxide basis):

$SiO_2$ 0-8;
$Sb_2O_3$ 0-<2;
$SiO_2+B_2O_3$ 1<20; and
$SiO_2+B_2O_3+GeO_2+HfO_2+In_2O_3$ 15-25.

In one embodiment, an optical glass is provided which comprises the following composition (in % by weight on an oxide basis):

$La_2O_3$ 30-50;
$B_2O_3$ 1-<20;
$GeO_2$ 0.1-20;
$HfO_2$ 0.1-10;
$In_2O_3$ 0.1-10;
$Gd_2O_3$ 1-30;
$Y_2O_3$ 0-12; and
$Yb_2O_3$ 0-15.

According to a further embodiment an optical glass is provided which comprises the following composition (in % by weight on an oxide basis):

$La_2O_3$ 35-47;
$B_2O_3$ 5-15;
$Gd_2O_3$ 5-20;
$SiO_2$ 0-6;
$GeO_2$ 0.1-15;
$HfO_2$ 0.5-6; and
$In_2O_3$ 0.5-6.

The glass according to the invention can also contain one or more of the following components in the following proportions (in % by weight on an oxide basis, unless indicated otherwise):

$Al_2O_3$ 0-5;
$WO_3$ 0-5;
ZnO 0-<11, preferably at most 10;
MgO 0-5;
CaO 0-5;
BaO 0-5;
SrO 0-5;
total $M_2O$ 0-3;
$P_2O_5$ 0-6; and
F 0-5% by weight.

For the purposes of the present invention, the expression $M_2O$ refers to the alkali metal oxides selected from the group consisting of $Li_2O$, $Na_2O$, $K_2O$, $Rb_2O$ and $Cs_2O$, preferably $Na_2O$ and $K_2O$. Total $M_2O$ means the sum of all proportions of alkali metal oxides in % by weight on an oxide basis.

The glasses of the invention preferably have a refractive index $n_d$ of at least 1.70, preferably at least 1.75, and/or a refractive index $n_d$ of at most 1.90, preferably at most 1.88. The Abbe number $v_d$ of the glasses of the invention is at least 40, preferably at least 42, and/or at most 55, preferably at most 53.

According to the present invention the term "optical position" means the position of a glass in the Abbe diagram and is defined by the refractive index $n_d$ and the Abbe number $v_d$.

According to an embodiment, the glasses of the invention are very "short" in a viscosity range from $10^{7.6}$ to $10^{13}$ dPas. Here, "short glasses" are glasses whose viscosity varies greatly in a particular viscosity range at a relatively small change in the temperature. The temperature interval $\Delta T$ in which the viscosity of this glass decreases from $10^{7.6}$ to $10^{13}$ dPas is preferably at most 100 K.

In the following, the expression "X-free" or "free of a component X" or "does not contain any X" means that the glass essentially does not contain this component X, i.e. such a component is present at most as an impurity in the glass, but is not added as glass component to the glass composition. Here, X may be any component, for example $Li_2O$.

In the following, all content figures are given in % by weight on an oxide basis, unless indicated otherwise. This also applies to totals and/or ratios or quotients of glass components.

These and other aspects and objects, features and advantages of the present invention will become apparent upon a consideration of the following detailed description.

It is to be understood that both the foregoing general description and the following detailed description are merely exemplary of the invention, and are intended to provide an over-view or framework for understanding the nature and character of the invention as claimed.

DETAILED DESCRIPTION

The base glass system is a lanthanum borate glass, with the borate being responsible for the solubility of the lanthanum oxide in the glass. Surprisingly, it has been found according to the present invention that stable glasses having the desired optical position can be obtained when both germanium oxide and hafnium oxide and also indium oxide are present in a lanthanum borate glass.

The glass of the invention contains $B_2O_3$, preferably in a proportion of from 1 to less than 20% by weight. The proportion of $B_2O_3$ is preferably restricted to at most 15% by weight, more preferably at most 13% by weight. The glass of the invention preferably contains at least 5% by weight of $B_2O_3$.

As further glass former in addition to $B_2O_3$, the glass of the invention can contain $SiO_2$ in a proportion of at most 8% by weight, preferably at most 6% by weight. $SiO_2$ serves to improve the processability by increasing the mechanical strength of the glass and is preferably present in a proportion of at least 2% by weight, more preferably in a proportion of at least 3% by weight.

The sum of the proportions of $SiO_2$ and $B_2O_3$ is at least 1% by weight and less than 20% by weight, preferably at most 17% by weight.

As further glass former, the glass of the invention contains $GeO_2$ in a proportion of preferably from 0.1 to 20% by weight. The proportion of $GeO_2$ is according to one embodiment at least 1% by weight and/or preferably at most 15% by weight, more preferably at most 12% by weight. The addition of this further glass former makes the glass of the invention more crystallization-stable without the solubility of the lanthanum oxide being decreased, as would be the case if a larger amount of $SiO_2$ were to be added. At the same time, $GeO_2$ has an advantageous effect on the desired optical position by increasing the refractive index of the glass further and decreasing the dispersion. According to one embodiment, the glass does not contain a higher amount of $GeO_2$ since this component is comparatively expensive. According to this embodiment the glass contains up to 12% by weight, more preferably up to 7% by weight; and most preferably up to 5% by weight.

The glass of the invention additionally contains $In_2O_3$ and $HfO_2$. $In_2O_3$ is contained in a proportion of from 0.1 to 10% by weight, preferably at least 0.5% by weight and/or preferably at most 6% by weight. The glass of the invention additionally contains $HfO_2$ in a proportion of from 0.1 to 10% by weight, preferably at least 0.5% by weight and/or preferably at most 6% by weight. These components are only rarely used as glass formers in optical glasses. However, it has been found that very stable glasses having a high refractive index and low dispersion can surprisingly be produced when using these components in combination with germanium oxide.

The sum of glass formers $SiO_2$, $B_2O_3$, $GeO_2$, $HfO_2$ and $In_2O_3$ is preferably at least 15% by weight and/or at most 32% by weight, more preferably at most 30% by weight, most preferably at most 27% by weight.

The glass of the invention can additionally contain the components $Al_2O_3$ and/or $P_2O_5$ as glass formers. $Al_2O_3$ may be contained in a proportion of at least 0.1% by weight and/or at most 7% by weight, preferably at most 5% by weight. $Al_2O_3$ can promote crystal growth and is therefore not preferred in proportions of more than 7% by weight. $P_2O_5$ may be contained in a proportion of at least 0.1% by weight and/or at most 7% by weight, preferably at most 5% by weight.

$La_2O_3$ is the most important "optical component" in the glass of the invention, i.e. is a component which has a substantial influence on the optical position of the glass, and is present in the glass of the invention in a proportion of preferably from 30 to 50% by weight. The glass preferably contains at least 35% by weight and/or at most 47% by weight of $La_2O_3$.

Apart from $La_2O_3$, the glass can contain $Gd_2O_3$ as a further optical component, as a result of which it is possible to achieve a high refractive index without the Abbe number being decreased. The proportion of $Gd_2O_3$ is preferably at least 1% by weight, more preferably at least 5% by weight. $Gd_2O_3$ is preferably present in the glass of the invention in a proportion of at most 30% by weight, more preferably at most 20% by weight.

Apart from $Gd_2O_3$, the glass of the invention can also contain $Y_2O_3$ and/or $Yb_2O_3$ in order to adjust the optical position in a proportion. $Y_2O_3$ may be contained in a proportion of at least 0.3% by weight, more preferably at least 1% by weight, and/or in a proportion of at most 20% by weight, more preferably at most 16% by weight. $Yb_2O_3$ may be contained in a proportion of at least 0.3% by weight, more preferably at least 1% by weight, and/or in a proportion of at most 20% by weight, more preferably at most 16% by weight.

The total proportion of $La_2O_3+Gd_2O_3+Y_2O_3+Yb_2O_3$ is preferably at least 60% by weight and/or at most 80% by weight.

As a further optical component which increases the refractive index of the glass and gives a moderate dispersion, the glass of the invention can contain $Ta_2O_5$ in a proportion of at least 0.1% by weight, preferably at least 1% by weight and/or at most 10% by weight, preferably at most 8% by weight.

However, this component is not preferred in particular embodiments of the invention and the glass is free of $Ta_2O_5$ in such an embodiment.

The glass of the invention can also contain $WO_3$ in a proportion of at least 0.1% by weight, preferably at least 0.5% by weight, in order to adjust the optical position. However, the proportion of $WO_3$ is preferably restricted to at most 7% by weight, preferably at most 5% by weight, since at higher proportions the transmission, in particular at the "blue edge", i.e. at a wavelength $\lambda$ of less than 420 nm, would be impaired. However, contrary to the assumptions of the prior art, such an impairment of the transmission by $WO_3$ surprisingly occurs only above a content of more than 3% by weight of $WO_3$. Proportions of $WO_3$ of up to 3% by weight surprisingly improve the transmission.

The glass preferably contains at least two, more preferably at least three, optical components selected from the group consisting of $La_2O_3$, $Gd_2O_3$, $Y_2O_3$, $Yb_2O_3$, $Ta_2O_5$ and $WO_3$ since a greater number of such components reduces the risk of crystallization.

The glass of the invention can contain fluorine as further optical component to effect fine adjustment of the optical position, but the proportion is restricted to preferably at most 15% by weight, more preferably at most 10% by weight. If fluorine is present in the glass, the glass preferably contains more than 0.2% by weight, more preferably at least 1% by weight and most preferably at least 2% by weight.

According to the invention, the quotient of the sums of the proportions by weight of the optical components (OC) divided by the sum of the proportions by weight of the glass former components (GF) (sum of OC/sum of GF, i.e. SOC/SGF) is at least 2.8, preferably at least 3.0, and/or preferably at most 4.5, preferably at most 4.0. According to the invention, glass former components are the components $B_2O_3$, $SiO_2$, $GeO_2$, $In_2O_3$, $HfO_2$, $Al_2O_3$ and $P_2O_5$. For the purposes of the invention, optical components are, in particular, the components $La_2O_3$, $Gd_2O_3$, $Y_2O_3$, $Yb_2O_3$, $Ta_2O_5$, $WO_3$ and fluorine. The components PbO, $SnO_2$, $ZrO_2$, $Nd_2O_5$ and/or $TiO_2$, for example, which are not preferred according to the invention are also known to those skilled in the art as optical components which have an influence on the optical position of the glass and can be used additionally or alternatively as optical components in less preferred embodiments.

Thus, the composition of the invention allows, compared to the prior art, a surprisingly high proportion of optical components to be introduced into the glass composition and the optical properties to be set very precisely. A high proportion of such optical components usually leads to crystallization-susceptible glasses because of their crystal nuclei-forming or crystal growth-promoting properties and glasses according to the prior art therefore contain a relatively high proportion of glass formers.

Apart from glass formers and optical components, the glass of the invention can additionally contain network transformers or network-modifying agents which influence, in particular, the viscosity-temperature profile of the glass.

In preferred embodiments, the glass of the invention contains ZnO in a proportion of at least 0.1% by weight, more preferably at least 0.2% by weight, and/or preferably at most 15% by weight, more preferably at most 10% by weight. ZnO in the proportion mentioned results in both a moderate refractive index and also a satisfactory shortness of the glass in the glass of the invention. Furthermore, this component inhibits crystallization.

Apart from ZnO, alkaline earth metal oxides, in particular, serve as network transformers. MgO, CaO, BaO and/or SrO can be present in a proportion of in each case at most 7% by weight, more preferably in each case at most 5% by weight. Their respective minimum proportion is preferably in each case at least 0.5% by weight, more preferably in each case at least 1% by weight.

In an embodiment, ZnO and $P_2O_5$ are not simultaneously present in the glass of the invention, i.e. variants of the glass containing ZnO preferably do not contain any $P_2O_5$ and variants of the glass containing $P_2O_5$ preferably to not contain any ZnO.

The sum of all alkaline earth metal oxides MO (MgO, CaO, BaO, SrO) is preferably restricted to a proportion of at most 7% by weight, more preferably to a proportion of at most 5% by weight.

The glass of the invention can contain alkali metal oxides, i.e. oxides of Li, Na, K, Rb, Cs, with the total proportion of these alkali metal oxides $M_2O$ preferably being restricted to a proportion of at most 5% by weight, more preferably at most 3% by weight, most preferably at most 1% by weight. Such small proportions of alkali metal oxides can be used for making slight adjustments in the temperature-viscosity profile in order to make the glass suitable for flexible, near-final-geometry hotforming. However, in an embodiment, the glass is free of alkali metal oxides.

The addition of alkali metal oxides can be preferred when the glass is to be used for ion exchange. In such a variant, more than 5% by weight of alkali metal oxides can also be present in the glass. When the glass is used as ion-exchange glass, the addition of at most 5% by weight of $Ag_2O$ is also preferred. In this use, the glass preferably also contains $Al_2O_3$ and/or $P_2O_5$, for example in a proportion of at least 0.5% by weight, since these components promote the formation of a structure in the glass which is favourable for ion exchange. However, even in such an embodiment, the above mentioned upper limits should not be exceeded.

In an embodiment of the present invention, the glass of the invention preferably comprises at least 90% by weight, more preferably at least 95% by weight, most preferably at least 98% by weight, of the abovementioned components, in particular $La_2O_3$, $Gd_2O_3$, $Y_2O_3$, $Yb_2O_3$, $WO_3$, F, $B_2O_3$, $SiO_2$, $GeO_2$, $In_2O_3$, $HfO_2$, $P_2O_5$, MgO, CaO, BaO, SrO and/or ZnO. According to one embodiment the glass essentially consist or consists of one or more elements selected from the group consisting of. $La_2O_3$, $Gd_2O_3$, $Y_2O_3$, $Yb_2O_3$, $WO_3$, F, $B_2O_3$, $SiO_2$, $GeO_2$, $In_2O_3$, $HfO_2$, $P_2O_5$, MgO, CaO, BaO, SrO and/or ZnO.

The glass of the invention can comprise conventional refining agents in small amounts. The sum of the refining agents added is preferably at most 1.0% by weight, more preferably at most 0.5% by weight. As refining agents, at least one of the following components can be present in the glass of the invention (in % by weight):

$Sb_2O_3$ 0-1; and/or
$As_2O_3$ 0-1; and/or
SnO 0-1; and/or
NaCl 0-1; and/or
$SO_4^{2-}$ 0-1; and/or
inorganic peroxides 0-1.

As inorganic peroxides, it is possible to use, for example, zinc peroxide, lithium peroxide and/or alkaline earth metal peroxides.

In a preferred embodiment of the present invention, however, the $As_2O_3$ content is at most 0.1% by weight or the glass is $As_2O_3$-free since this component is considered to be problematical for ecological reasons.

The glass of the invention is preferably free of PbO, $As_2O_3$, $Li_2O$, $Na_2O$, $K_2O$, $Rb_2O$, $Cs_2O$, $SnO_2$, $ZrO_2$, $Nd_2O_5$, $Ta_2O_5$ and/or $TiO_2$. $ZrO_2$, $Nd_2O_5$, $Ta_2O_5$ and/or $TiO_2$, in particular, can promote crystallization; in addition, $ZrO_2$, $Nb_2O_5$ and/or $TiO_2$ would also greatly increase the dispersion.

The glass of the invention is preferably free of $Bi_2O_3$ since this component can impair the transmission of the glass by ionic absorption of the Bi(III), in particular at the "blue edge" ($\lambda$<420 nm). Furthermore, $Bi_2O_3$ can be reduced to colloidal Bi(0) in the glass melt and thus decrease the transmission of the glass virtually wavelength-independently over the entire visible spectral region. However, avoidance of redox processes in the melt in order to avoid Bi(0) formation requires a greater outlay for melting.

In a further embodiment of the present invention, the glass of the invention is also preferably free of other components not mentioned above as preferred components, i.e. according to such an embodiment, the glass consists essentially of the components mentioned above as preferred components. The expression "consisting essentially of" means, for the present purposes, that other components are present at most as impurities, but are not deliberately added as individual component to the glass composition.

The glass of the invention is, as optical glass, preferably free of colour-imparting components such as oxides of V, Cr, Mn, Fe, Co, Ni and/or Cu, and/or optically active, e.g. laser-active, components such as oxides of Pr, Nd, Sm, Eu, Tb, Dy, Ho, Er and/or Tm. In addition, the glass is preferably free of components which are considered to be hazards to health or are considered to be problematical from an ecological point of view, e.g. oxides of As, Pb, Cd, Tl and Se.

In another embodiment of the present invention as base glass of an optical filter or solid-state laser, the glass of the invention can comprise colour-imparting and/or optically active, e.g. laser-active, components in amounts of up to at most 5% by weight, with these amounts being in addition to the components adding up to 100% by weight in the remaining glass composition.

Furthermore, all glasses of the invention have good chemical resistance and stability in respect of crystallization or crystallization stability. They are also characterized by good meltability and flexible, near-end-geometry processability, low production costs due to reduced process costs, good ion exchange properties, good solarization stability and also good environmental compatibility.

The glasses of the invention have a Tg of less than or equal to 640° C., are crystallization-stable and can be processed readily.

The glasses of the invention have negative anomalous relative partial dispersions $\Delta P_{g,F}$ of from 15 to 105×10$^{-4}$, measured on specimens after cooling at a cooling rate of about 20 K/h.

The glasses of the invention have coefficients of thermal expansion $\alpha_{20-300}$ of less than or equal to 10×10$^{-6}$/K. In this way, problems with thermal expansion during further processing and joining technology are avoided.

The glasses of the invention have specific densities of less than or equal to 6.0 g/cm$^3$. The optical elements and/or optical components made from them are therefore particularly suitable for mobile/movable units because of their low inertial mass relative to lead-containing pendants.

For the purposes of the invention, the "internal quality" of a glass refers to the glass containing a very small proportion of bubbles and/or streaks and/or similar defects and preferably being free of these. In an embodiment, the glass of the invention contains no volume streaks which can be determined by the shadow method in at least one direction, preferably in two mutually perpendicular directions. In the shadow method, a glass specimen is held either between a light source and the eye of the viewer and the shadow-casting streaks are determined by moving and tilting the glass specimen (MIL-G-174A and similar standards), or light is shone through the glass specimen and the streaks present in the glass specimen are projected as shadows on a projection screen (ISO 10110-4). Furthermore, the glass preferably conforms to the bubble class B1, more preferably B0, in accordance with ISO 10110-3.

The glass of the invention preferably has, at a specimen thickness of 10 mm, a degree of internal transmittance $\tau_{ip}$ at 600 nm and/or 700 nm of at least 95%, more preferably at least 98%. In particular, the glass has, at a specimen thickness of 10 mm, a degree of internal transmittance $\tau_{ip}$ at 410 nm of at least 75%, more preferably at least 80%, even more preferably at least 82%.

Such a setting of optical position, viscosity-temperature profile and processing temperatures that a high-specification close-to-final-geometry hotforming is ensured even when using sensitive precision machines has been achieved by the glasses of the invention. In addition, a correlation of crystallization stability and viscosity-temperature profile which makes further thermal treatment, e.g. pressing or repressing or ion exchange processes, of the glasses readily possible has been achieved.

The present invention further relates to the use of the glasses of the invention for the application areas imaging, sensor technology, microscopy, medical technology, digital projection, telecommunication, optical messaging technology/information transfer, optics/illumination in the automotive sector, photolithography, steppers, excimer lasers, wafers, computer chips and also integrated circuits and electronic instruments which contain such circuits and chips.

The present invention further provides optical elements which comprise the glass of the invention. Optical elements can, in particular, be lenses, prisms, light guide rods, arrays, optical fibres, gradient components, optical windows and compact components. For the purposes of the invention, the term "optical element" also encompasses preforms of such an optical element, for example gobs, precision gobs and the like.

The invention further provides a process for producing an optical element, which comprises the step: blank pressing (precise pressing) of the optical glass of the invention.

The invention further provides for the use of an optical element of this type for producing optical components, for example for sensor technology, microscopy, medical technology, digital projection, telecommunication, optical messaging technology/information transmission, optics/illumination in the automotive sector, photolithography, steppers, excimer lasers, wafers, computer chips and also integrated circuits and electronic instruments which contain such circuits and chips.

The invention further provides optical components, for example for imaging, sensor technology, microscopy, medical technology, digital projection, telecommunication, optical messaging technology/information transmission, optics/illumination in the automotive sector, photolithography, steppers, excimer lasers, wafers, computer chips and also integrated circuits and electronic instruments which contain such circuits and chips, comprising optical elements as mentioned above.

The entire disclosures of all applications, patents and publications, cited above and below, and of corresponding German application DE 102013219683 filed Sep. 30, 2013, are hereby incorporated by reference.

The present invention will be illustrated below by a series of examples. However, the present invention is not limited to the examples mentioned.

Examples

Tables 2 and 3 contain 13 examples in the preferred composition range, and Table 4 contains three comparative examples. The glasses described in the examples were produced as follows:

The raw materials for the oxides, preferably the corresponding oxides, nitrates or carbonates, are weighed out, one or more refining agents such as $Sb_2O_3$ are optionally added and the mixtures are subsequently well mixed. The glass mix is melted at about 1250° C. in a batch melting apparatus, then refined (1300° C.) and homogenized. The glass can be cast at a casting temperature of about 1000° C. and processed to give the desired dimensions. In a large-volume, continuous apparatus, the temperatures can, on the basis of experience, be decreased by at least about 100 K, and the material can be processed in a close-to-final-geometry hotforming process, e.g. precision pressing.

Melting example for 100 kg of calculated glass (Example No. 5):

| Oxide | % by weight | Raw material | Weight used (kg) |
|---|---|---|---|
| $La_2O_3$ | 39.9 | $La_2O_3$ | 16.91 |
| $B_2O_3$ | 11.8 | $(LaF_3)$ | (26.66) |
| $SiO_2$ | 3.4 | $H_3BO_3$ | 20.96 |
| $GeO_2$ | 5.9 | $SiO_2$ | 3.40 |
| $HfO_2$ | 1.4 | $GeO_2$ | 5.90 |
| $In_2O_3$ | 1.9 | $HfO_2$ | 1.42 |
| F | 7.6 | $In_2O_3$ | 1.90 |
| $Y_2O_3$ | 0.4 | $LaF_3$ | 26.66 |
| $Gd_2O_3$ | 15.0 | $Y_2O_3$ | 0.40 |
| $Yb_2O_3$ | 12.7 | $Gd_2O_3$ | 15.00 |
|  |  | $Yb_2O_3$ | 12.70 |
| Total | 100.0 |  | 105.25 |

TABLE 2

Melting examples (in % by weight)

|  | Ex. 1 | Ex. 2 | Ex. 3 | Ex. 4 | Ex. 5 | Ex. 6 | Ex. 7 |
|---|---|---|---|---|---|---|---|
| $La_2O_3$ | 40.0 | 39.9 | 39.9 | 46.9 | 39.9 | 41.1 | 36.7 |
| $B_2O_3$ | 10.1 | 10.2 | 11.8 | 10.0 | 11.8 | 11.1 | 10.2 |
| $SiO_2$ |  |  | 3.4 | 3.7 | 3.4 | 3.5 | 4.8 |
| $GeO_2$ | 5.2 | 4.9 | 5.9 | 1.8 | 5.9 | 6.1 | 4.9 |
| $HfO_2$ | 2.0 | 1.8 | 1.4 | 1.2 | 1.4 | 1.4 | 1.2 |
| $In_2O_3$ | 1.7 | 1.9 | 1.9 | 2.0 | 1.9 | 2.0 | 1.3 |
| F | 9.4 | 2.4 | 7.6 | 3.0 | 7.6 | 5.9 |  |
| $Y_2O_3$ |  | 6.0 | 0.4 | 8.4 | 0.4 | 0.4 | 11.5 |
| $Gd_2O_3$ | 17.5 | 17.9 | 15.0 | 8.7 | 15.0 | 15.4 | 16.3 |
| $Yb_2O_3$ | 11.5 | 12.6 | 12.7 |  | 12.7 | 13.1 | 12.9 |
| $WO_3$ | 2.6 | 0.6 |  | 4.7 |  |  |  |
| ZnO |  | 1.9 |  | 9.6 |  |  | 0.2 |
| Total | 100.0 | 100.0 | 100.0 | 100.0 | 100.0 | 100.0 | 100.0 |
| SOC | 71.6 | 79.4 | 75.6 | 71.7 | 75.6 | 75.9 | 77.4 |
| SGF | 19.0 | 18.8 | 24.4 | 18.7 | 24.4 | 24.1 | 22.4 |
| SOC/SGF | 3.73 | 4.22 | 3.10 | 3.83 | 3.10 | 3.15 | 3.46 |
| $n_d$/20K/h | 1.8023 | 1.8627 | 1.7979 | 1.8488 | 1.7622 | 1.7784 | 1.8711 |
| $\nu_d$/20K/h | 47.72 | 44.35 | 49.41 | 42.71 | 52.29 | 50.78 | 44.20 |
| $P_{g,F}$ | 0.5623 | 0.5642 | 0.5580 | 0.5679 | 0.5627 | 0.5549 |  |
| $\Delta P_{g,F}$ | −12 | −50 | −27 | −40 | 68 | −35 |  |
| $\alpha_{20\text{-}300}$ |  |  |  |  |  | 9.2 | 9.2 |
| $T_g$ |  |  |  |  |  | 593 | 603 |
| $\rho$ |  |  |  |  |  | 5.52 | 5.58 |

SGF: Sum of glass formers ($B_2O_3$, $SiO_2$, $GeO_2$, $HfO_2$, $In_2O_3$, $P_2O_5$)
SOC: Sum of optical components ($Y_2O_3$, $Gd_2O_3$, $Yb_2O_3$, $La_2O_3$, $WO_3$, F)

TABLE 3

Melting examples (in % by weight)

|  | Ex. 8 | Ex. 9 | Ex. 10 | Ex. 11 | Ex. 12 | Ex. 13 | Ex. 14 |
|---|---|---|---|---|---|---|---|
| $La_2O_3$ | 37.0 | 36.0 | 41.0 | 41.0 | 41.0 | 41.0 | 42.2 |
| $B_2O_3$ | 7.0 | 6.0 | 10.0 | 10.1 | 10.1 | 10.1 | 10.4 |
| $SiO_2$ |  |  | 3.4 | 3.5 | 3.5 | 3.5 | 3.6 |
| $GeO_2$ | 11.0 | 12.0 | 6.1 | 6.1 | 6.1 | 6.1 | 6.3 |
| $HfO_2$ | 2.0 | 1.0 | 1.5 | 1.5 | 1.5 | 1.5 | 1.5 |
| $In_2O_3$ | 2.0 | 1.0 | 4.8 | 1.9 | 1.9 | 1.9 | 2.0 |
| F | 4.0 | 6.0 | 4.1 | 4.1 | 4.1 | 4.1 | 4.2 |
| $P_2O_5$ |  |  |  |  | 2.9 |  |  |
| $Y_2O_3$ |  | 1.0 | 0.4 | 0.4 | 0.4 | 0.4 | 0.4 |
| $Gd_2O_3$ | 17.0 | 19.0 | 15.4 | 15.4 | 15.4 | 15.4 | 15.9 |
| $Yb_2O_3$ | 9.0 | 15.0 | 13.0 | 13.1 | 13.1 | 13.1 | 13.5 |
| ZnO | 6.0 | 3.0 |  |  |  |  |  |
| MgO | 5.0 |  |  |  |  |  |  |

TABLE 3-continued

Melting examples (in % by weight)

|  | Ex. 8 | Ex. 9 | Ex. 10 | Ex. 11 | Ex. 12 | Ex. 13 | Ex. 14 |
|---|---|---|---|---|---|---|---|
| CaO |  |  |  |  | 2.9 |  |  |
| BaO |  |  |  |  |  | 2.9 |  |
|  |  |  |  |  |  |  |  |
| Total | 100.0 | 100.0 | 100.0 | 100.0 | 100.0 | 100.0 | 100.0 |
| SOC | 67.0 | 77.0 | 73.9 | 74.0 | 74.0 | 74.0 | 76.2 |
| SGF | 22.0 | 20.0 | 25.8 | 26.0 | 23.1 | 23.1 | 23.8 |
| SOC/SGF | 3.05 | 3.85 | 2.86 | 2.85 | 3.20 | 3.20 | 3.20 |
| $n_d$/20K/h | 1.8212 | 1.8131 | 1.8064 | 1.7837 | 1.7968 | 1.7983 |  |
| $\upsilon_d$/20K/h | 44.09 | 46.81 | 48.26 | 50.39 | 48.70 | 49.10 |  |
| $P_{g,F}$ | 0.5642 | 0.5607 | 0.558 | 0.5547 | 0.5568 | 0.5585 |  |
| $\Delta P_{g,F}$ | −54 | −43 | −47 | −43 | −51 | −27 |  |
| $\alpha_{20-300}$ | 9.79 | 9.99 | 9.13 | 8.99 | 9.72 | 9.49 |  |
| $T_g$ | 615 | 604 | 636 | 629 | 631 | 624 | 632 |
| $\rho$ | 5.68 | 6.12 | 5.71 | 5.51 | 5.53 | 5.66 |  |

SGF: Sum of glass formers ($B_2O_3$, $SiO_2$, $GeO_2$, $HfO_2$, $In_2O_3$, $P_2O_5$, $Al_2O_3$)
SOC: Sum of optical components ($Y_2O_3$, $Gd_2O_3$, $Yb_2O_3$, $La_2O_3$, $WO_3$, F)

TABLE 4

Comparative examples (in % by weight)

|  | Comp. Ex. 1 | Comp. Ex. 2 | Comp. Ex. 3 |
|---|---|---|---|
| $La_2O_3$ | 30.0 | 36.5 | 46.8 |
| $B_2O_3$ | 11.0 | 12.7 | 19.7 |
| $SiO_2$ | 6.0 | 5.0 | 1.5 |
| $GeO_2$ |  |  | 0.5 |
| $HfO_2$ | 20.0 | 1.8 | 0.6 |
| $In_2O_3$ | 4.0 | 1.2 |  |
| F |  |  | 1.3 |
| $Y_2O_3$ |  | 12.8 | 0.3 |
| $Gd_2O_3$ | 29.0 | 17.0 | 4.4 |
| $Yb_2O_3$ |  | 13.0 | 2.2 |
| $WO_3$ |  |  | 5.4 |
| ZnO |  |  | 17.3 |
|  |  |  |  |
| Total | 100.0 | 100.0 | 100.0 |
| Sum of OC | 59.0 | 79.3 | 60.4 |
| Sum of GF | 41.0 | 20.7 | 22.3 |
| SOC/SGF | 1.44 | 3.83 | 2.71 |
| State after casting | crystallized | crystallized | crystallized |

SGF: Sum of glass formers ($B_2O_3$, $SiO_2$, $GeO_2$, $HfO_2$, $In_2O_3$, $P_2O_5$)
SOC: Sum of optical components ($Y_2O_3$, $Gd_2O_3$, $Yb_2O_3$, $La_2O_3$, $WO_3$, F)

All glasses of the Examples are free from volume streaks in at least one direction as determined by the shadow method, conform to bubble class B1 in accordance with ISO 10110-3 and have an internal transmittance $\tau_{ip}$ at 600 nm and 700 nm of at least 95% and an internal transmittance $\tau_{ip}$ at 410 nm of at least 75%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. Optical glass comprising $La_2O_3$, $B_2O_3$, $GeO_2$, $HfO_2$, and $In_2O_3$ wherein the following components are present in the following proportions, in % by weight on an oxide basis:
   $SiO_2$ 0-8;
   $Sb_2O_3$ 0-<2;
   $SiO_2+B_2O_3$ 1-<20; and
   $SiO_2+B_2O_3+GeO_2+HfO_2+In_2O_3$ 15-25.

2. The optical glass according to claim 1, further comprising components in the following proportions, in % by weight, on an oxide basis:
   $La_2O_3$ 30-50;
   $B_2O_3$ 1-<20;
   $GeO_2$ 0.1-20;
   $HfO_2$ 0.1-10; and
   $In_2O_3$ 0.1-10.

3. The optical glass according to claim 2, further comprising components in the following proportions, in % by weight, on an oxide basis:
   $Gd_2O_3$ 1-30;
   $Y_2O_3$ 0-12; and
   $Yb_2O_3$ 0-15.

4. The optical glass according to claim 1, further comprising components in the following proportions, in % by weight, on an oxide basis:
   $La_2O_3$ 35-47;
   $B_2O_3$ 5-15;
   $Gd_2O_3$ 5-20;
   $SiO_2$ 0-6;
   $GeO_2$ 0.1-15;
   $HfO_2$ 0.5-6; and
   $In_2O_3$ 0.5-6.

5. The optical glass according to claim 1, further comprising components in the following proportions, in % by weight on an oxide basis, unless indicated otherwise:
   $Al_2O_3$ 0-5;
   $WO_3$ 0-5;
   $Ta_2O_5$ 0-8;
   ZnO 0-10;
   MgO 0-5;
   CaO 0-5;
   BaO 0-5;
   SrO 0-5;
   Total $M_2O$ 0-3;
   $P_2O_5$ 0-6;
   $Sb_2O_3$ 0-1; and
   F 0.2-10% by weight, wherein the $M_2O$ refers a sum of alkali metal oxides selected from the group consisting of $Li_2O$, $Na_2O$, $K_2O$, $Rb_2O$, and $Cs_2O$.

6. The optical glass according to claim 1, further comprising a quotient of a sum of proportions by weight of optical components (SOC) divided by a sum of proportions by weight of glass former components (SGF) of more than 2.80, wherein optical components are selected from the group consisting of $La_2O_3$, $Gd_2O_3$, $Y_2O_3$, $Yb_2O_3$, $Ta_2O_5$, $WO_3$ fluorine, and combinations thereof, and wherein glass former components are selected from the group consisting of $B_2O_3$, $SiO_2$, $GeO_2$, $In_2O_3$, $HfO_2$, $Al_2O_3P_2O_5$, and combinations thereof.

7. The optical glass according to claim 6, wherein the quotient is at least 3.0.

8. The optical glass according to claim 6, wherein the quotient is at most 4.0.

9. The optical glass according to claim 1, further comprising a sum of proportions by weight of $La_2O_3+Gd_2O_3+Y_2O_3+Yb_2O_3$ is at least 60% by weight.

10. The optical glass according to claim 9, wherein the sum is at most 80% by weight.

11. The optical glass according to claim 1, further comprising a sum of proportions by weight of $La_2O_3+Gd_2O_3+Y_2O_3+Yb_2O_3$ is at most 80% by weight.

12. The optical glass according to claim 1, wherein the optical glass does not contain PbO, $As_2O_3$, $Bi_2O_3$, $Li_2O$, $Na_2O$, $K_2O$, $Rb_2O$, $Cs_2O$, $ZrO_2$, $SnO_2$, $Nb_2O_5$, $Ta_2O_5$, and $TiO_2$ as added components.

13. The optical glass according to claim 1, wherein the glass is free of components one or more of color-imparting components, radioactive components, and fluorescent components as an added component(s).

14. The optical glass according to claim 1, wherein the optical glass has a refractive index $n_d$ of from 1.70 to 1.90.

15. The optical glass according to claim 14, wherein the optical glass has an Abbe number $v_d$ of from 40 to 55.

16. The optical glass according to claim 1, wherein the optical glass has a refractive index $n_d$ of from 1.75 to 1.88.

17. The optical glass according to claim 1, wherein the optical glass has an Abbe number $v_d$ of from 40 to 55.

18. The optical glass according to claim 1, wherein the optical glass has an Abbe number $v_d$ of from 42 to 53.

19. An optical element comprising the optical glass of claim 1.

20. An optical component comprising the optical element according to claim 19.

* * * * *